United States Patent [19]

Konno

[11] Patent Number: 4,880,073

[45] Date of Patent: Nov. 14, 1989

[54] FOUR-WHEEL STEERING SYSTEM OF A MOTOR VEHICLE

[75] Inventor: Toshihiro Konno, Tokyo, Japan

[73] Assignee: Fuji Jukogyo Kabushiki Kaisha, Tokyo, Japan

[21] Appl. No.: 278,751

[22] Filed: Nov. 30, 1988

[30] Foreign Application Priority Data

Dec. 21, 1987 [JP] Japan .................... 62-193763[U]

[51] Int. Cl.$^4$ .......................... B62D 5/04; B62D 6/02
[52] U.S. Cl. .................................. 180/140; 180/79.1; 280/91
[58] Field of Search .............. 180/140, 141, 142, 79.1; 280/91

[56] References Cited

U.S. PATENT DOCUMENTS 4,700,960 10/1987 Miki et al. ............................ 180/140
4,776,418 10/1988 Winckler et al. .................... 180/140

FOREIGN PATENT DOCUMENTS 63-125476 5/1988 Japan .................................... 180/140

Primary Examiner—John A. Pekar
Attorney, Agent, or Firm—Martin A. Farber

[57] ABSTRACT

A front-wheel steering system has a hydraulic power cylinder, and a control valve responsive to operation of a steering wheel for controlling oil supplied to the power cylinder so as to assist steering effort. A detector cylinder device is provided for cooperating with the power cylinder. The detector cylinder has a detector piston, a pair of chambers formed on the opposite sides of the detector piston and communicated with chambers on opposite sides of the piston of the power cylinder, and a pair of springs provided in the chambers for urging the detector piston to a neutral position. A potentiometer is connected to one of a rod of the detector piston, thereby producing an output signal in accordance with displacement of the detector piston. In response to the output signal, rear wheels are steered.

2 Claims, 2 Drawing Sheets

FOUR-WHEEL STEERING SYSTEM OF A MOTOR VEHICLE

BACKGROUND OF THE INVENTION

The present invention relates to a system for steering rear wheels of a motor vehicle.

A four-wheel steering system for steering rear wheels together with front wheels is known. The rear wheels are steered in the same direction as the front wheels or in the opposite direction to the front wheels in accordance with a steering angle of the front wheels and a vehicle speed of the motor vehicle.

The rear wheels are steered when a driver intentionally turns a steering wheel in order to go round a curve. However, the four-wheel steering system also operates in accordance with behaviors of the vehicle body and the front wheels caused by outside forces and disturbances to steer the rear wheels in spite of the straight-ahead driving. Japanese Patent Application Laid-Open No. 63-125476 discloses a four-wheel steering system for preventing such a malfunction. In the system, hydraulic pressures in right and left chambers of a power cylinder in the front-wheel steering system are respectively detected by a pair of pressure sensors, and the pressure difference between both pressures is calculated by a calculator in order to detect the behavior of the vehicle. Accordingly, swaying of a vehicle caused by a disturbing force such as wind is detected and the rear wheels are steered accordingly to steady the vehicle, although the steering wheel is at a neutral position for straight-ahead driving.

However, since a pair of pressure sensors are provided for producing output signals, an electric control system for processing the output signals becomes complicated in construction.

SUMMARY OF THE INVENTION

The object of the present invention is to provide a steering system in which a single sensor for detecting the pressure difference is provided for producing a single output signal, so that the system is simple in structure and has a high reliability.

According to the present invention, there is provided a steering system for a motor vehicle having a front-wheel steering system including a steering wheel, a hydraulic power cylinder, a piston of which is operatively connected to front wheels, and a control valve responsive to operation of the steering wheel for controlling oil supplied to the power cylinder so as to assist steering effort.

The system comprises a detector cylinder device having a detector piston with a pair of rods on opposite sides of the piston, a pair of chambers formed on the opposite sides of the detector piston and communicated with chambers on opposite sides of the piston of the power cylinder, and a pair of springs provided in the chambers for urging the detector piston to a neutral position, a potentiometer operatively connected to one of the rods of the detector piston, for producing an output signal in accordance with displacement of the detector piston, and rear-wheel steering means responsive to the output signal for steering rear wheels.

In as aspect of the invention, the potentiometer comprises a resistor element, and a sliding contact operatively connected to the detector piston so as to slide on the resistor element.

The other objects and features of this invention will become understood from the following description with reference to the accompanying drawings.

DETAILED DESCRIPTION OF THE PREFERRED EMBODIMENT

Figure 1:
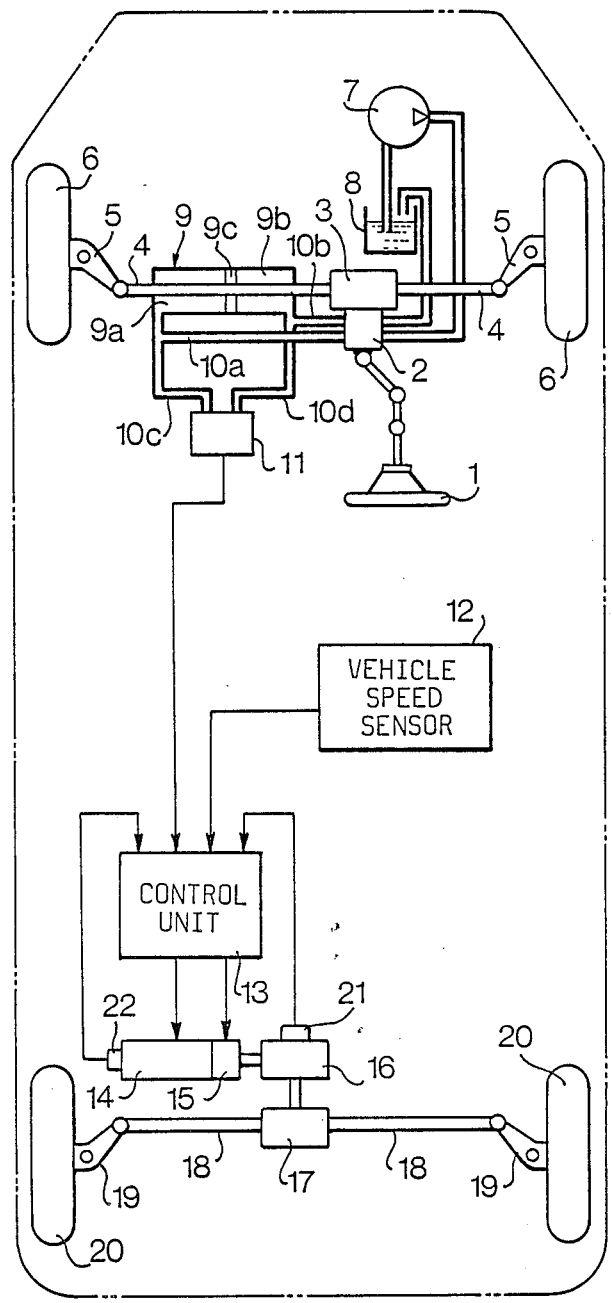
FIG. 1 is a schematic plan view of the system according to the present invention.

Referring to FIG. 1, a hydraulic linkage-type power steering system to which the present invention is applied comprises a steering wheel 1, a control valve 2, a gear box 3, a pair of tie rods 4 connected to the gear box 3, and a pair of knuckle arms 5 each connected to one of the tie rod 4 for a front wheel 6 of a motor vehicle. The left-hand tie rod 4 has a piston 9c in a hydraulic power cylinder 9. The hydraulic power cylinder 9 has left and right oil chambers 9a and 9b which are respectively connected to the control valve 2 through oil pipes 10a and 10b. The control valve 2 is operated by the steering wheel 1 to selectively communicate the chambers 9a, 9b with a hydraulic pump 7 and an oil reservoir tank 8. When the steering wheel 1 is turned in one direction, the steering system and the control valve 2 are operated in dependence on the turning of the steering wheel. One of the chambers 9a and 9b of the hydraulic power cylinder 9 is supplied with oil from the pump 7, so that hydraulic assist force is generated in the steering direction so as to reduce a steering effort on the steering wheel.

A hydraulic pressure difference detector 11 is connected to the chambers 9a and 9b through oil pipes 10c and 10d. The detector 11 is provided for detecting a pressure difference between pressures of the chambers 9a and 9b and applies an electric signal representing the pressure difference to a control unit 13. The system is provided with a vehicle speed sensor 12 for producing a vehicle speed signal which is applied to the control unit 13. The control unit 13 determines a desired rear-wheel steering angle (including a steering direction) in accordance with the pressure difference and the vehicle speed and produces an output signal which is applied to an electric motor 14 of a rear-wheel steering system.

In the rear-wheel steering system, the motor 14 is provided for steering rear wheels 20. A rotary shaft of the motor 14 is connected to an input shaft of an electromagnetic clutch 15. When the clutch 15 is engaged in accordance with a signal from the control unit 13, the rotation of rotary shaft of the motor 14 is transmitted to the rear wheels 20 through a reduction device 16, gear box 17, tie rods 18, and knuckle arms 19. Thus, the rear wheels 20 are steered at the desired steering angle.

An angle sensor 21 is provided on the reduction device 16 for detecting the steering angle of the rear wheels and a rotational speed sensor 22 is provided on the motor 14 for detecting the motor speed. Output signals of both sensors 21 and 22 are applied to the control unit 13 for the feedback control.

Figure 2:
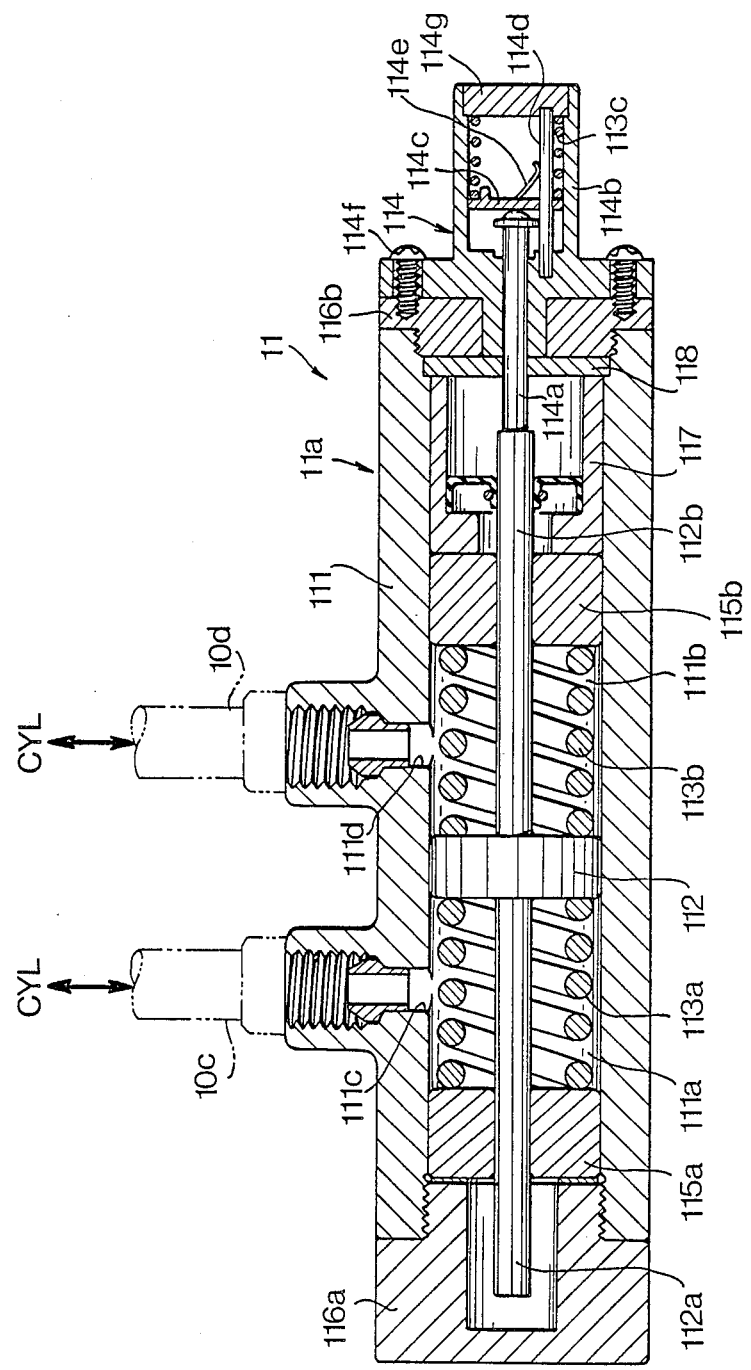
FIG. 2 is a sectional view of a hydraulic pressure difference detector of the system.

Referring to FIG. 2, the pressure difference detector 11 comprises a cylinder device 11a of a double acting and double rod type and a potentiometer 114 attached to the cylinder device 11a.

The cylinder device 11a has a cylinder 111, a piston 112 slidably mounted in the cylinder 111, and two rods 112a and 112b extending from opposite sides of the piston 112. End portions of the rods 112a and 112b are slidably supported by retainers 115a and 115b which are fixed to the inside wall of the cylinder 111, respectively, and both ends of the rods are projected from the retainers. By the piston 112 and retainers 115a and 115b, left and right chambers 111a and 111b are defined. A pair of springs 113a and 113b are disposed between the piston 112 and the retainer 115a and 115b, for urging the piston 112 to a neutral position. The chambers 111a and 111b are respectively communicated with the chambers 9a and 9b of the power cylinder 9 through pipes 10c and 10d at inlet ports 111c and 111d formed in the cylinder 111. Both ends of the cylinder 111 are sealed by cap members 116a and 116b which are threaded into inner peripheries of the cylinder. An innermost end of the cap member 116a is engaged with the retainer 115a and an innermost end of the cap member 116b is engaged with the retainer 115b through a sleeve 117 and a spacer 118.

The potentiometer 114 comprises a cylinder 114b secured to the cap member 116b by screws 114f, a rod 114a slidably mounted in the cylinder 114b and abutted against the end of the rod 112b, a piston 114c slidably mounted in the cylinder 114b and engaged with an end of the rod 114a, and a spring 113c provided between the piston 114c and a cap 114g of the cylinder 114b for urging the piston 114b and hence the rod 114a to the rod 112b. A resistor element 114d is provided in the cylinder 114b. A sliding contact 114e is secured to the piston 114c so as to slide on the resistor element 114d.

When hydraulic pressures in the chambers 9a and 9b of the power cylinder 9 are balanced, hydraulic pressure in the chamber 111a is equal to that in the chamber 111b, so that the piston 112 is maintained at the neutral position.

When the steering wheel 1 is turned to the left, for example, the control valve 2 is operated to apply the actuating oil to the left chamber 9a and to drain the oil in the right chamber 9b through the pipe 10b. Thus, tie rods 4, 4 are moved to the right in accordance with the pressure difference, so that the steering effort is reduced.

At that time, the pressure in the chamber 111a increases and a pressure difference is produced between the chambers 111a and 111b. Accordingly, the piston 112 moved to the right and the rod 114a is correspondingly moved to the right. The piston 114c is pushed to slide the sliding contact 114e to the right for displacing a contact position on the resistor element 114d. Thus, the output voltage of the potentiometer 114 varys.

Namely, pressure difference in the cylinder 9 is converted into a single stroke of the piston 112 and the stroke is converted into a voltage signal by the potentiometer 114.

If the vehicle is subjected to a disturbing force generated by a a gust of wind, for example, and the vehicle body is swayed, a cornering force generates on the front wheels. Accordingly, a pressure difference occurs in the cylinder 9. The pressure difference between the chambers 9a and 9b are detected by the detector 11 and the potentiometer 114 produces a voltage signal in accordance with displacement of the piston 112. Thus, the rear wheels 20 are steered.

For example, if the motor vehicle is driven at a middle or high speed of 70 km/h or more, the rear wheels are steered in a direction for cancelling the cornering force (in the same direction as the front wheels).

Since the pressure difference in the cylinder 9 approximately corresponds to the cornering force, the rear wheels is controlled in accordance with the cornering force exerted on the front wheels. Thus, the driving stability of the vehicle can be improved.

In accordance with the present invention, a single hydraulic pressure difference detector having a potentiometer is provided for detecting the pressure difference in the power cylinder, so that structure of the system can be simplified and reliability of the operation can be improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A steering system for a motor vehicle having a front-wheel steering system including a steering wheel, a hydraulic power cylinder, a piston of which is operatively connected to front wheels, and a control valve responsive to operation of the steering wheel for controlling oil supplied to the power cylinder so as to assist steering effort, the system comprising:
   a detector cylinder device having a detector piston with a pair of rods on opposite sides of the piston, a pair of chambers formed on the opposite sides of the detector piston and communicated with chambers on opposite sides of the piston of the power cylinder, and a pair of springs provided in the chambers for urging the detector piston to a neutral position;
   a potentiometer operatively connected to one of the rods of the detector piston, for producing an output signal in accordance with displacement of the detector piston; and
   rear-wheel steering means responsive to the output signal for steering rear wheels.

2. The steering system according to claim 1 wherein the potentiometer comprises a resistor element, and a sliding contact operatively connected to the detector piston so as to slide on the resistor element.

* * * * *